United States Patent
Marasco

[11] 3,733,465
[45] May 15, 1973

[54] LOG-BASE ANALOG BALLISTICS COMPUTER

[75] Inventor: Paul M. Marasco, Cherry Hill, N.J.

[73] Assignee: The United States of America as represented by the Secretary of the Army, Washington, D.C.

[22] Filed: June 16, 1971

[21] Appl. No.: 153,681

[52] U.S. Cl. ............... 235/61.5 E, 73/167, 235/197
[51] Int. Cl. ............................................. G06g 7/80
[58] Field of Search ................ 235/61.5 R, 61.5 E, 235/186, 197; 89/1 R, 28, 125; 343/7; 33/48, 49 R, 49 C, 49 D; 73/167

[56] References Cited

UNITED STATES PATENTS

| | | | |
|---|---|---|---|
| 3,604,897 | 9/1971 | McAdam, Jr. et al. | 235/61.5 E |
| 3,604,912 | 9/1971 | Frohock, Jr. | 235/61.5 R X |
| 3,591,772 | 7/1971 | McAdam, Jr. et al. | 235/61.5 E |
| 3,386,172 | 6/1968 | Wossagk | 33/49 R |
| 3,526,754 | 9/1970 | Graefe et al. | 89/1 R X |

Primary Examiner—Eugene G. Botz
Assistant Examiner—Jerry Smith
Attorney—Harry M. Saragovitz

[57] ABSTRACT

An electronic analog ballistics computer wherein various ballistics correction analog signals as well as the log of the range from a range finder, either optical or one employing the laser principle are applied to a summing amplifier whose output is effectively the log of the adjusted range ($R_n'$). Since the superelevation $\phi_s$ is a function of range for any specific ammunition and constitutes a family of graphic functions for the various ammunitions, an intermediate selected $\phi_s$ function is generated such that when the log $R'$ signal is provided as an input the output will be the superelevation therefor. The superelevation $\phi_s$ is then applied to a multiplier into which is also fed the output of an operational amplifier which receives the lateral correction factors and effectively sums them. Thus, the multiplier output constitutes the total horizontal correction and when applied with the superelevation $\phi_s$ to a resolver whose other input which may be internal is the cant angle, the resultant output provides the total elevation above the line of sight and the total lateral deflection from the line of sight in the gun axis with only the necessity of a single function generator. These output signals can then be applied to the sighting mechanism to correct the reticle for the total of all ballistic factors.

3 Claims, 8 Drawing Figures

FUNCTION GENERATOR MEANS
27' (SEE EQ 7b)

FUNCTION GENERATOR MEANS
27" (SEE EQ 7a)

LOG-BASE ANALOG BALLISTICS COMPUTER

The invention described herein may be manufactured, used and licensed by or for the Government for governmental purposes without the payment to me of any royalty thereon.

BACKGROUND OF THE INVENTION

The present invention relates to a ballistic correction computer for combat vehicles and more particularly pertains to a ballistics computer which provides correction signals for the sighting mechanism and employs only a single function generator for superelevation and time-of-flight for the various types of ammunition.

DESCRIPTION OF THE PRIOR ART

In the field of combat vehicles ballistics computers, it has been the general practice to employ electromechanical systems to generate the analog correction factors. The tank ballistics computer is operated in conjunction with either a laser range finder or an optical range finder. In the case of the laser range finder, the laser beam is directed toward the target and the returned signal is electro-optically converted into a binary coded series of pulses (BCD) indicative of the target range. An analog signal is derived by processing these pulses through a digital to analog converter. In the most recent advance these ac range voltages are fed through precisely chosen input resistors to a bank of normally open switches. An ac reference voltage is likewise fed to a like bank of switches through a second set of precisely chosen input resistors. The ac range voltages are also converted into dc levels and as such are utilized to preselectively enable logic circuitry which connects supply control or enabling signals to the aforementioned switch banks. The laser BCD signals enable certain portions of the logic circuitry to the exclusion of other portions. Those portions that are enabled, function to enable certain switch pairs in the switch banks for passage therethrough of the ac range information (after development across certain of the first set of the input resistors) and of the ac reference voltage (after development across certain of the second set of input resistors). The ac range information developed across the first set of input resistors provides the slopes while the ac reference voltage developed across the second set of input resistors provides the intercepts of straight lines utilized to fit or approximate a non-linear ballistic function. This system, however, requires a separate $\phi_s$ function generator and a separate time of flight function generator for each ammunition which in turn necessitates multiple resistor banks and switching circuits thus increasing costs and decreasing reliability and limiting accuracy due to the approximation of only specific portions of the function curve.

SUMMARY OF THE INVENTION

The general purpose of this invention is to provide a ballistics computer that has all the advantages of similarly employed prior art devices and has none of the above described disadvantages. To attain this, the present invention provides a unique electronic computer wherein an intermediate superelevation ($\phi_s$) function is generated by processing a log range input from the sums of the vertical correction inputs as well as the range. The log range input is the range of the intermediate function derived from the true range for the particular ammunition. A proportion of the $\phi_s$ output which closely approximates time of flight is then multiplied by the total lateral correction factors and, both this product and the $\phi_s$ are fed into a resolver which, with the cant angle provides the necessary reticle corrections along the tank axes.

An object of the present invention is to provide a simple, reliable, low cost, solid state, ballistics computer for providing sighting corrections for a combat vehicle.

Another object is to provide an all electronic ballistics computer which employs but a single function generator for both the superelevation, and the time-of-flight functions for various ammunitions and may be used in conjunction with either a laser range finder or an optical type range finder.

Other objects and many of the attendant advantages of this invention will be readily appreciated as the same becomes better understood by reference to the following detailed description when considered in connection with the accompanying drawings.

DESCRIPTION OF A PREFERRED EMBODIMENT

Figure 1:
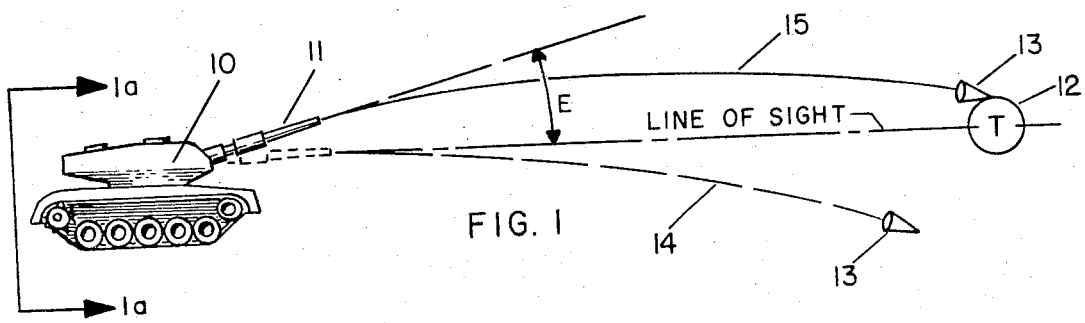
FIG. 1 is side elevation of the projectile trajectory from a tank firing at a target.
Figure 1A:
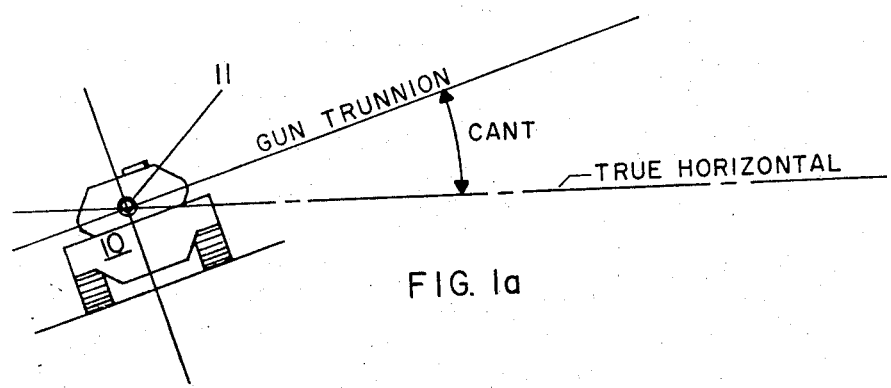
FIG. 1a is a rear view taken approximately along line 1a—1a of FIG. 1.
Figure 2:
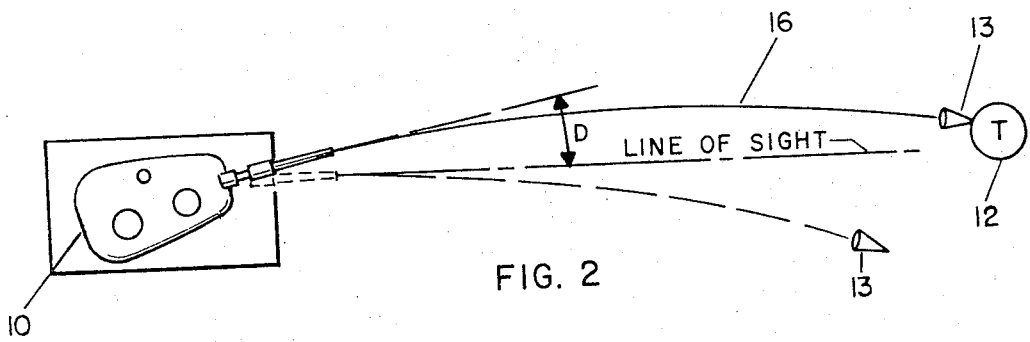
FIG. 2 is top view of the projectile trajectory of FIG. 1.
Figure 3:
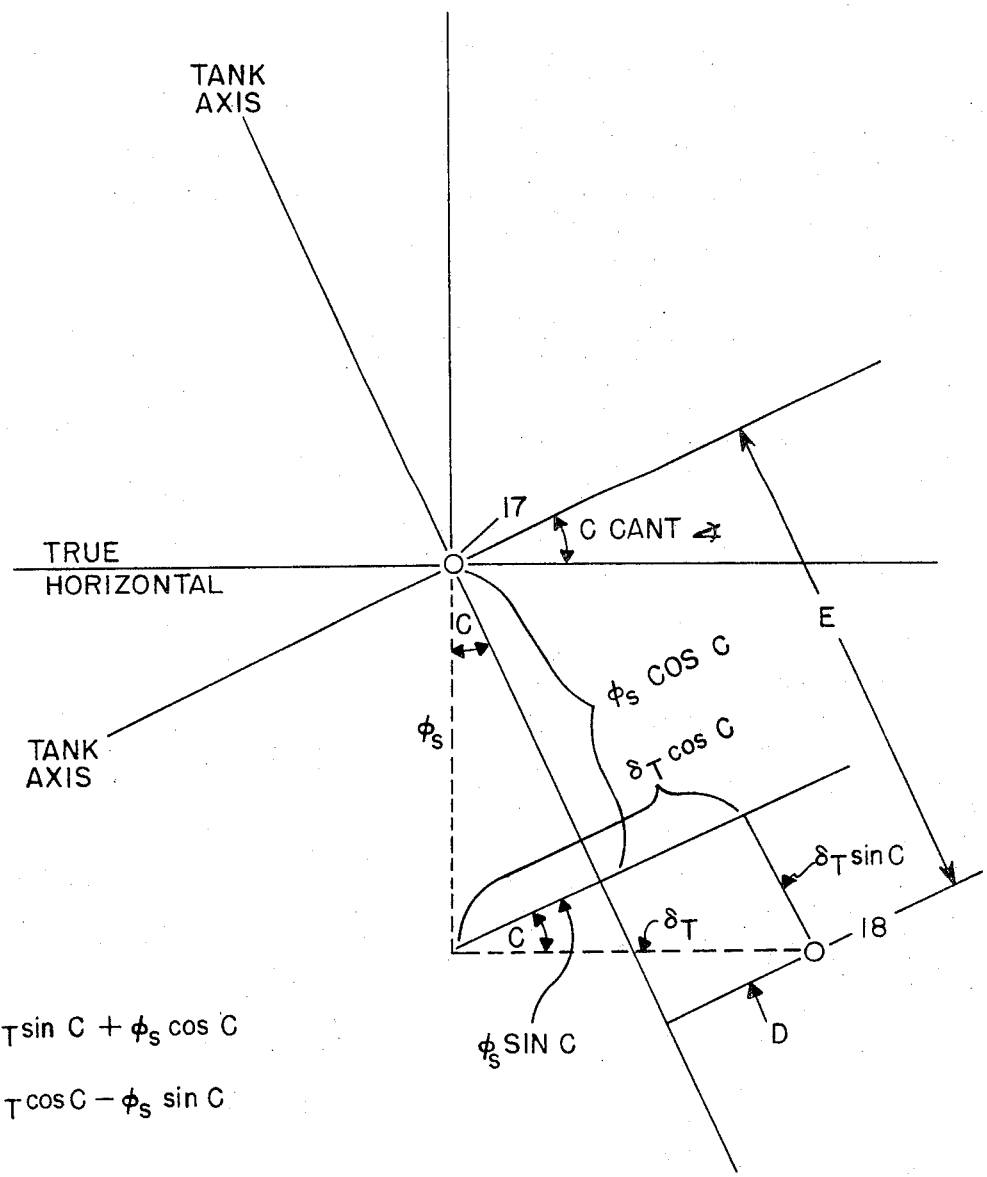
FIG. 3 is a representation of the reticle displacement in accordance with the correction factors.

Although the invention described herein has been applied to the ballistics of a tank it is quite clear that the same computer system could be equally well associated with various other forms of ballistics. It is well known that direct line of sight firing is not possible except at extremely short ranges due to various inherent factors influencing the trajectory of the projectile. These factors, of course, include the characteristics of the ammunition employed, the effect of gravity, meteorological effects, muzzle velocity drop, lead, drift etc. and result in both vertical and lateral deflection. Vertical deflection in simplified form is shown in FIG. 1. FIG. 1a shows the tank 10 in a canted position at some cant angle C to the true horizontal. Should the tank gun 11 be directed or pointed along the line of sight (LOS) directly at the target 12, the projectile 13 will follow path 14 and fall short or below the target 12. It is therefore necessary to raise the gun to some superelevation angle E above the true horizontal so as to follow a new trajectory path 15 in order to impact the target. FIG. 2 illustrates the analogous situation for lateral deflection where the line of sight trajectory results in the projectile missing the target and passing on the right thereof. By redirecting the gun toward the left a defection correction angle D the projectile will follow path 16 to strike the target. These target corrections are applied by repositioning the reticle of the sighting mechanism downwardly (for vertical) and toward the right (for lateral deflection) as shown in FIG. 3 where the uncorrected or normal position 17 of the reticle 18 is centered. It is clear that the reticle must be realigned to a new position determined from the following ballistics equations:

$$E = \delta_t \sin C + \phi_s \cos C \quad (1)$$

$$D = \delta_t \cos C - \phi_s \sin C \quad (2)$$

where,
$E$ = total elevation (mils) in the gun axis
$D$ = total lateral deflection (mils) in the gun axis
$\phi_s$ = total superelevation correction above (LOS) (mils) in the true vertical plane
$\delta_t$ = total true horizontal correction (mils)
$C$ = cant angle between gun trunnion axis and the horizontal.

The above equations are necessary in this form since the reticle can only move along or with respect to the tank axes and not the true earth axes so that both $D$ and $E$ are measured along the tank axes. The cant angle information is internally available from a local pendulum and it remains to ascertain $\phi_s$ and $\delta_t$ in order to solve the foregoing equations.

Figure 4:
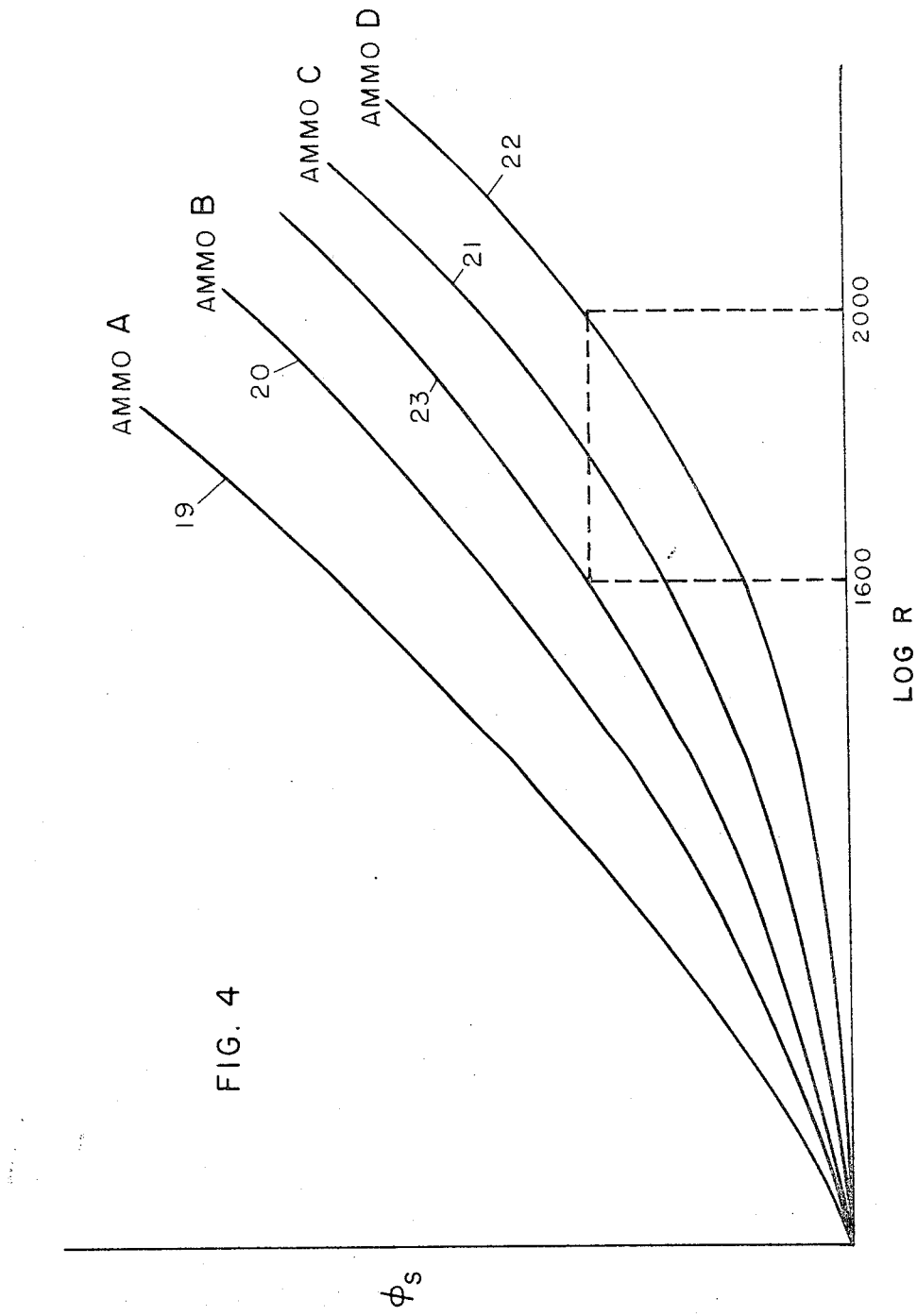
FIG. 4 is a graphic plot of the superelevation vs the range for various ammunitions as well as an intermediate curve.

By physically firing projectiles and using the various types of ammunitions, data has been obtained at the proving grounds sufficient to plot the superelevation as a function of range (or log R range) for each ammunition. Such typical graphs are illustrated in FIG. 4 by way of a family of curves 19–22. Since these form a family of curves, then, within limits, by selecting some intermediate curve 23 the superelevation for any of the ammunitions is the same as that fro the intermediate curve 23 but for another range. The true range R is a linear function of the intermediate curve range: namely, $$R_n' = K_n \cdot R_t \quad (3)$$

where
$R_n'$ = intermediate curve range for ammunition $n$
$K_n$ = proportional factor for ammo $n$
$R_t$ = true range Thus, as an example, for ammunition $D$ at a true range of 2,000 and having a $K_D$ factor of 0.8, the intermediate curve range $R_D'$ is 1,600 with the same $\phi_s$ for both. The factor $K$ can either be greater or less than one dependent on where the curves lie in relation to curve 23. A closer approximation is obtained by employing:

$$R_n' = K_n \cdot R_t^{x_n}$$

where $X_n$ depends on the ammo, and provides a closer approximation. Taking the log of both sides, $$\log R_n' = \log K_n + X_n \cdot \log R_t$$

and, since $\log K_n$ is a constant, the equation can be rewritten and the other constant effects $K_m$ = meteorological (air density, pressure etc.), $K_{EFC}$ = tube wear, muzzle velocity etc. added to provide:

$$\log R_n' = K_n + K_{EFC} + X_n \cdot \log R_t \quad (4)$$

Considering now the lateral correction factors:

$$\delta_t = \delta_w + \delta_d + \delta_e \quad (5)$$

where
$\delta_w$ = horizontal crosswind correction
$\delta_d$ = horizontal ammo drift correction
$\delta_e$ = horizontal moving target correction
$\delta_t$ = total horizontal correction and it is known that the following equation provides a suitable approximation for the time of flight function:

$$t_{p_n} = K_s \cdot \phi_{s_n} \quad (6)$$

where
$t_{p_n}$ = time of flight for ammo $n$
$\phi_{s_n}$ = superelevation for ammo $n$ it is also known that the following relationships provide suitable approximations for the specific corrections:

$$\delta_w = K_1 \cdot W t_p \text{ (wind)}$$
$$\delta_d = K_2 \cdot t_p \text{ (drift)}$$
$$\delta_e = K_3 \cdot \dot{A}_o \cdot t_p \text{ (lead)}$$

then:

$$\delta_t = t_p [K_1 \cdot W + K_2 + K_3 \cdot \dot{A}_o]$$

or $$\delta_t = K \phi_s (K_1 \cdot W + K_2 + K_3 \cdot \dot{A}_o) \quad (7)$$

Figure 6:
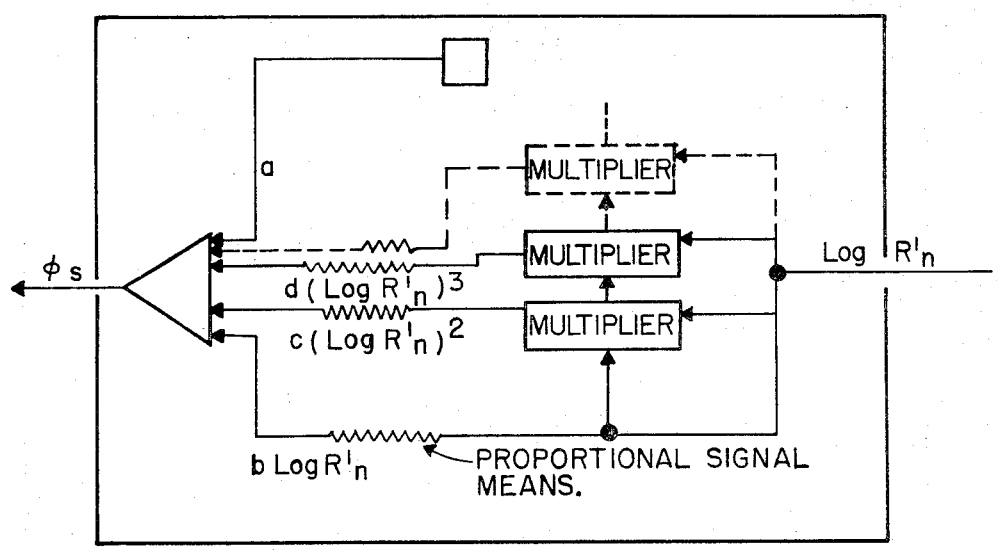
FIG. 6 illustrates one means for generating $\phi_s$.
Figure 7:
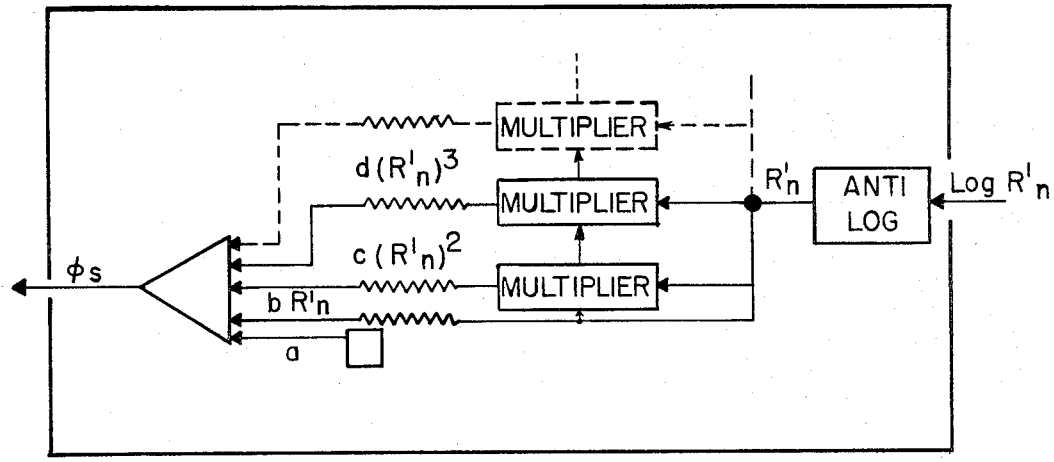
FIG. 7 illustrates another means for generating $\phi_s$.

The generation of the basic $\phi_s$ function can be either by a piece-wise linear or polynomial technique. The piece wise techniques has been described in the prior art and the polynomial method can use either R or log R as the independent variable:

$$\phi_s = a + bR + CR^2 + dR^3 \text{ [see FIG. 7]} \quad (7a)$$

$$\phi_s = a + b (\log R) + c (\log R)^2 + d (\log R)^3 \text{ [see FIG. 6]} \quad (7b)$$

The basic function can also be generated as follows:

$$\phi_s = AR'X + BR'Y \quad (7c)$$

where $A$, $X$, $B$ and $Y$ are selected for best possible approximation of the intermediate curve or function. taking the logs of the two terms of equation (7c) we have:

$$\log \phi_s = \log A + X \log R' \text{ and } \log B + Y \log R' \quad (8)$$

and by taking the inverse log of the above, and adding (see FIG. 5) them in a summer the resultant is $\phi_s$. Clearly, there a number of means for generating the $\phi_s$ function and the above is shown for illustrative purposes in that normal optical range finder provides a log R output.

Figure 5:
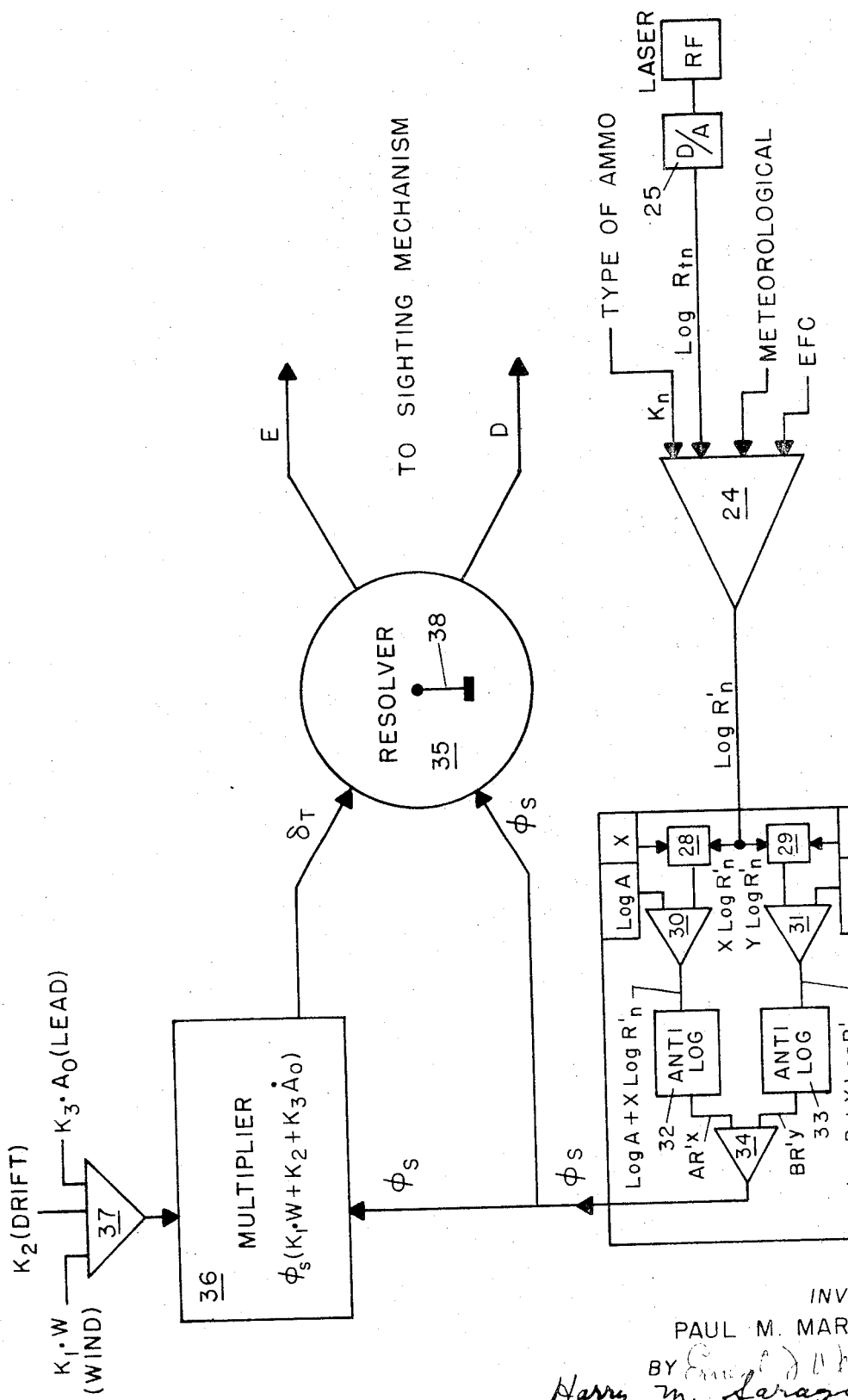
FIG. 5 is a block diagram of an embodiment made in accordance with the principle of this invention.

The system computer of FIG. 5 performs the necessary operations to provide both the $D$ and $E$ outputs. Summing amplifier 24 receives a plurality of inputs including the $K_n$ factor for the type of ammunition and the other constant $K$ factors for the meteorological and EFC effects. These may be applied from a series of selected voltage taps by means of a single push button switch or any other suitable means. If the rangefinder is of the laser type then its output is in the form of BCD pulses and by applying the output to a digital to analog converter 25 the analog output therefrom is equal to the log $R$. The output of amplifier 24 is in accordance with equation (4) log $R_n'$ and fed into the $\phi_s$ function generator 27, where the mathematical operation of equation (8) is performed by first taking the appropriate proportions of log $R_n'$, namely applying the log $R_n'$ input to a pair of proportional devices 28 and 29. The outputs $X$ log $R_n'$ and $Y$ log $R_n'$ and the log $A$ and log $B$ constants are summed at amplifiers 30, 31 and the sums thereafter antilogged at 32, 33 and their outputs themselves summed at amplifier 34 to provide the $\phi_s$ as in equation 7c. The $\phi_s$ voltage output is divided, with a portion serving as one input to resolve 35 and another portion being one input to multiplier 36. The lateral factors $K_1$, $K_2$ and $K_3 \cdot A_o$ provide the other input to the multiplier as the sums thereof from operational amplifier 37 so that the output is the sum of the products of the inputs namely $\delta_t$. The multiplier 36 output is applied as the other input to resolver 35 which may receive a true vertical input or be provided with an internal true vertical such as pendulum 38 so that the tank cant angle will be available. The resolver trigonometrically operates on the inputs in accordance with equations (1) and (2) thereby supplying the $D$ & $E$ outputs which are applied to the sighting means to correct the position of the sighting reticle. Thus it is clear that there is provided a ballistics computer which is direct, compact and operates with only one function generator.

Summarizing the system as a method it is clear that the following steps are necessary to perform the function:

a. summing the elevation and ammunition correction factors with the log range signals, b. generating a superelevation ballistics ($\phi_s$) function signal from the first summed output, c. summing the lateral deflection correction factor signals, d. multiplying the summed lateral correction signals with the superelevation function signal, e. resolving the multiplied output and the superelevation function signal and thereafter where necessary, f. resolving in accordance with the gun trunnion cant angle.

It should be understood, of course, that the foregoing disclosure relates to only a preferred embodiment of the invention and that numerous modifications or alterations may be made therein without departing from the spirit and the scope of the invention as set forth in the appended claims.

I claim:

1. A ballistics computer for providing correction signals for positioning the sighting means of a gun system having an adjustably mounted gun wherein said system includes means supplying lateral, and elevation corrections for multiple ammunition types utilizing log range information signals which computer comprises:

first summing means connected to receive said elevation and ammunition correction signals and log range information, a function generator for generating a ballistics superelevation ($\phi_s$) function signal intermediate the functions of those of the ammunition fired by said gun system, and connected to receive the output of said first summing means, wherein said function generator provides the superelevation ($\phi_s$) function in accordance with: $\phi_s\ AR'^X + BR'^Y$ where $a$, $x$, $B$ and $Y$ are constants for approximating said intermediate function and said function generator includes:

separate signal means for providing signals analogous to $X$ and $Y$ constants, and the log $A$ and log $B$, a pair of function generator multipliers each receiving the output of said first summing means and one of said pair receiving said analogous $X$ signal and the other of said pair receiving said analogous $X$ signal, a pair of function generator summers, one connected to receive the output of one of said pair of function generator multipliers and said log $B$ analogous signal, and other of said pair of function generator summers connected to receive the output of the other of said pair of function generator multipliers and said log $A$ analogous signal, a pair of antilog means each connected to receive the output of one of said pair of function generator summers, function generator summing means connected to receive the outputs of said pair of antilog means to provide at its output said superelevation, second summing means connected to receive said lateral correction signals and having its output connected to one input of, a multiplier means having its other input connected to the output of said function generator, a trigonometric resolver having a pair of inputs and outputs, one of said inputs connected to receive the output of said function generator and the other of said pair of inputs connected to receive the output of said multiplier means, cant means for supplying gun trunnion cant angle signals to said resolver.

whereby said pair of outputs will provide correction signals for said sighting means.

2. A ballistics computer for providing correction signals for positioning the sighting means of a gun system having an adjustably mounted gun wherein said system includes means supplying lateral, and elevation corrections for multiple ammunition types utilizing log range information signals which computer comprises:

first summing means connected to receive said elevation and ammunition correction signals and log range information, a function generator for generating a ballistics superelevation ($\phi_s$) function signal intermediate the functions of those of the ammunition fired by said gun system, and connected to receive the output of said first summing means, wherein said function generator provides the superelevation ($\phi_s$) function in accordance with:

$$\phi_s = a + b \log R + c(\log R)^2 + d(\log R)^3 \ldots$$

and said function generator includes:

separate proportional signal means for each of said constants $a, b, c, d \ldots$, a function generator multiplier for each of said constants except the first two ($a$, $b$), having a pair of inputs and outputs, one output of each connected to an input of the next succeeding multiplier, an input terminal means connecting the other input of each of said function generator multipliers together, the remaining output of each of said function generator multipliers connected through its respective said proportional means to the input of a function generator summing means a separate connecting means coupling said terminal means via said $b$ proportional means with said function generator summing means and connecting said terminal to one input of the first function generator multiplier second summing means connected to receive said lateral correction signals and having its output connected to one input of, a second multiplier means having its other input connected to the output of said function generator, a trigonometric resolver having a pair of inputs and outputs, one of said inputs connected to receive the output of said function generator and the other of said pair of inputs connected to receive the output of said second multiplier means, cant means for supplying gun trunnion cant angle signals to said resolver.

whereby said pair of outputs will provide correction signals for said sighting means.

3. A ballistics computer for providing correction signals for positioning the sighting means of a gun system having an adjustably mounted gun wherein said system includes means supplying lateral, and elevation corrections for multiple ammunition types utilizing log range information signals which computer comprises:

first summing connected to receive said elevation and ammunition correction signals and log range information, a function generator for generating a ballistics superelevation ($\phi_s$) function signal intermediate the functions of those of the ammunition fired by said gun system, and connected to receive the output of said first summing means, wherein said function generator provides the superelevation ($\phi_s$) function accordance with:

$$\phi_s = a + b\, R_n' + c\, (R_n')^2 + d\, (R_n')^3 \ldots$$

said generator including;

anti log means a function generator summing means a plurality of function generator multipliers having a pair of inputs and outputs a plurality of proportional signal means corresponding to said constants $a, b, c \ldots,$ a plurality of signal paths intermediate said anti-log means and said function generator summing means including therein one input and output of said function generator multipliers and its respective proportional signal means, means connecting the other output of the function generator multiplier to the other input of the next succeeding function generator multiplier, a first separate path intermediate said anti log means and said function generators summing means including the first proportional signal means and the other input of the first function generator multiplier second summing means connected to receive said lateral correction signals and having its output connected to one input of, a multiplier means having its other input connected to the output of said function generator, a trigonometer resolver having a pair of inputs and outputs, one of said inputs connected to receive the output of said function generator and the other of said pair of inputs connected to receive the output of said multiplier means, cant means for supplying gun trunnion cant angle signals to said resolver.

whereby said pair of outputs will provide correction signals for said sighting means.

* * * * *